C. E. MYERS.
STITCHING MACHINE.
APPLICATION FILED JUNE 17, 1918.

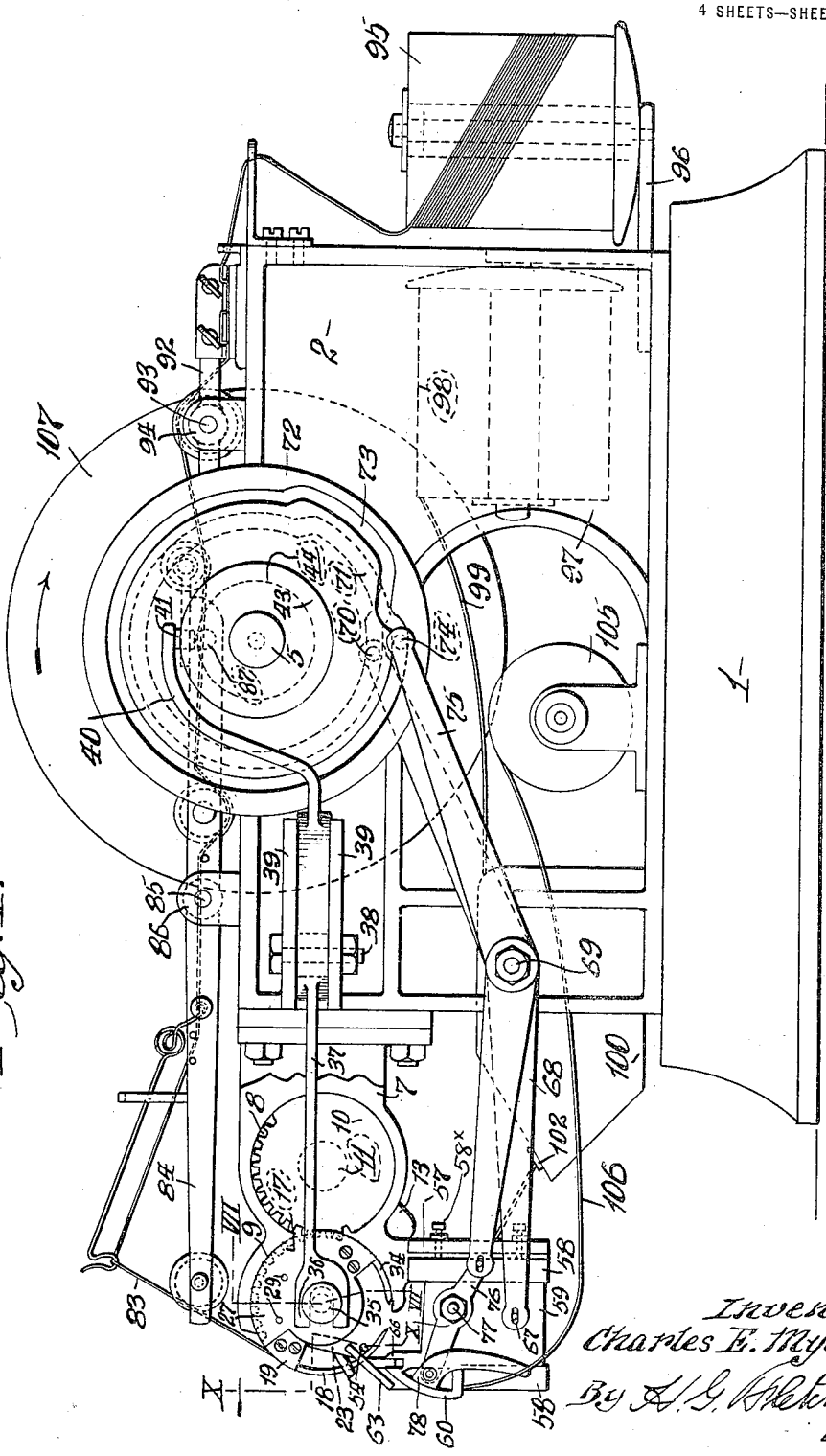

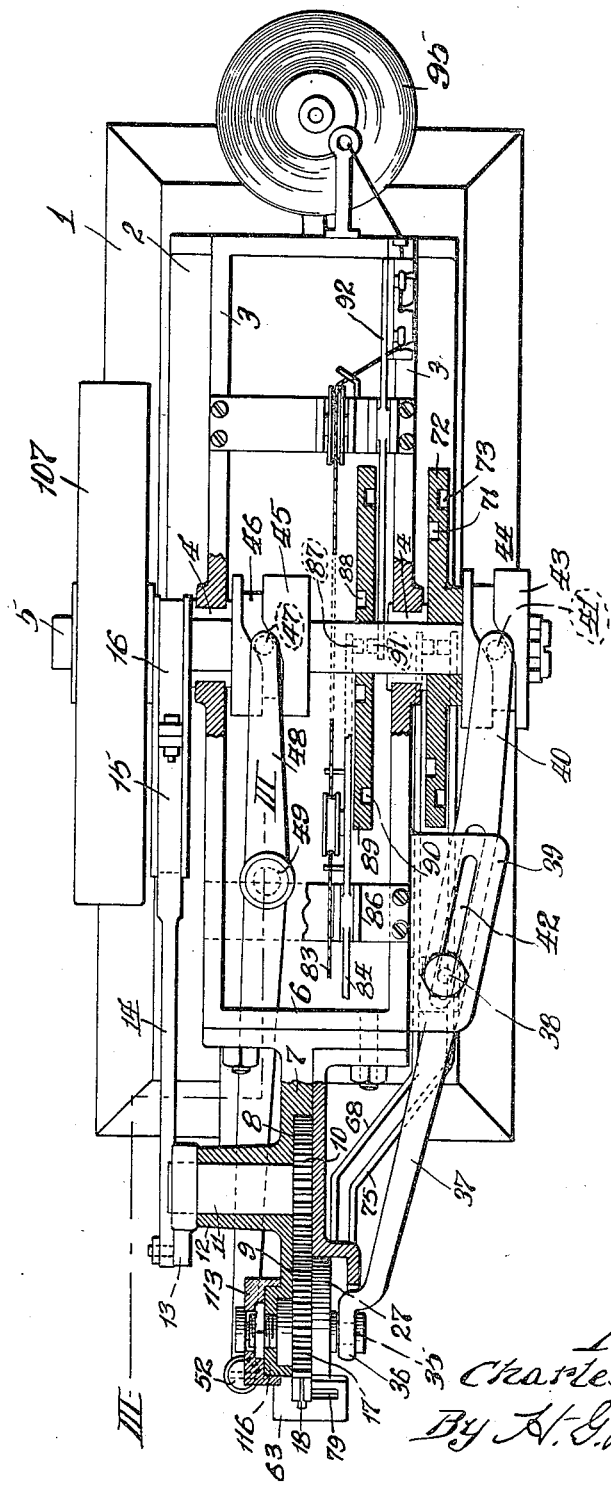

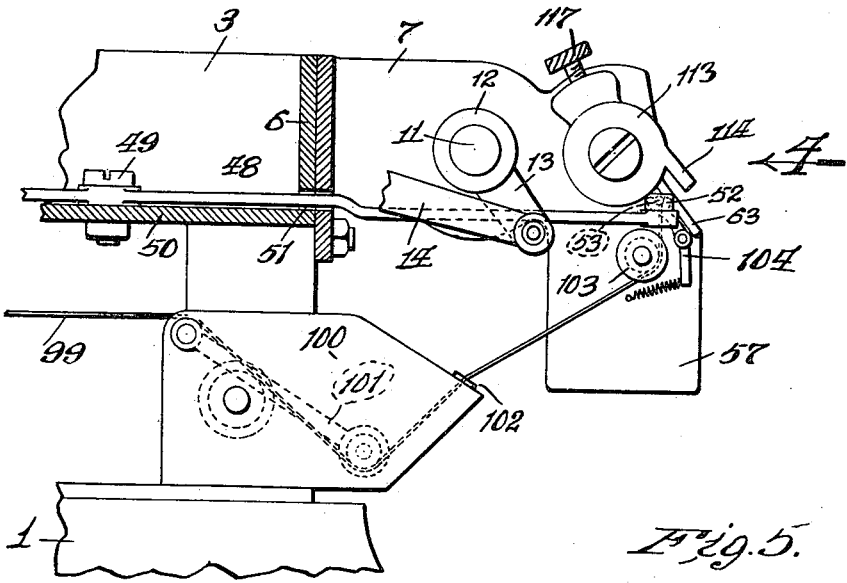
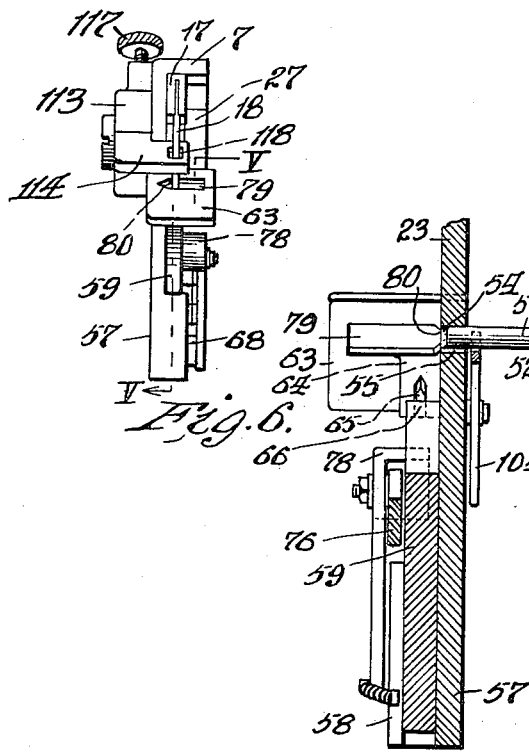
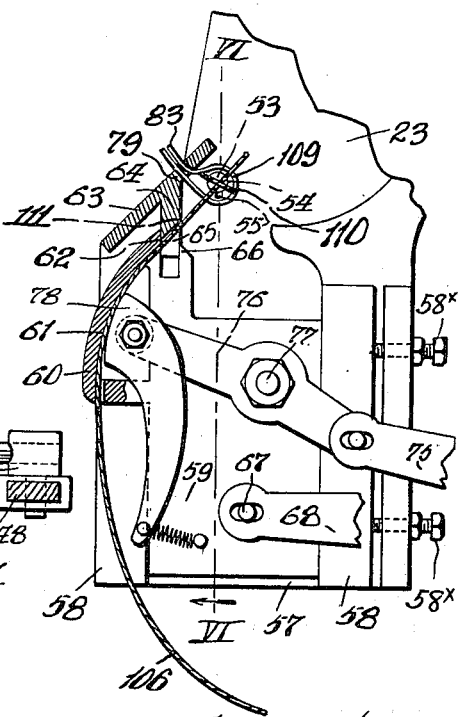

1,375,411.

Patented Apr. 19, 1921.
4 SHEETS—SHEET 4.

Inventor:
Charles E. Myers.
By H. B. Fletcher
atty.

UNITED STATES PATENT OFFICE.

CHARLES E. MYERS, OF ST. LOUIS, MISSOURI, ASSIGNOR, BY MESNE ASSIGNMENTS, TO ACME LOCK STITCH SEWING MACHINE COMPANY, OF ST. LOUIS, MISSOURI, A CORPORATION OF MISSOURI.

STITCHING-MACHINE.

1,375,411.　　　　　Specification of Letters Patent.　　Patented Apr. 19, 1921.

Application filed June 17, 1918. Serial No. 240,291.

*To all whom it may concern:*

Be it known that I, CHARLES E. MYERS, a citizen of the United States of America, and a resident of the city of St. Louis and State of Missouri, have invented certain new and useful Improvements in Stitching-Machines, of which the following is a specification.

The main object of this invention is to provide an improved stitching head in a sewing machine for leather goods, such as shoes, harness and the like, in which an improved manner of stitching is obtained.

Another object of the invention is to provide an improved stitching machine whereby an improved lock stitch is obtained in which the interlacing junctures of the threads are drawn into the awl opening in the material, thereby preventing the interlacing junctures from exposure and henceforth protecting them from wear.

A further object of the invention is to provide improved means in a stitching machine whereby the locking thread forming part of the improved lock stitch, after being interlacingly engaged, is severed and pulled into the awl puncture thereby preventing the locking thread from being pulled out of interlacing engagement with the loop threads.

Other and further objects will appear in the specification and be specifically pointed out in the appended claims, reference being had to the accompanying drawings exemplifying the invention, and in which—

Figure 1 is a side elevation of this improved stitching machine, a portion thereof being broken away so as to disclose a portion of the stitching head.

Fig. 2 is a plan view of Fig. 1, portions thereof being shown in section.

Fig. 3 is a fragmentary side elevation, partly in section, taken approximately on the line III—III of Fig. 2.

Fig. 4 is a front elevation taken in the direction of the arrow 4 (Fig. 3).

Fig. 5 is an enlarged fragmentary vertical section taken approximately on the line V—V of Fig. 4.

Fig. 6 is an enlarged vertical section taken on the line VI—VI of Fig. 5.

Fig. 12 is an enlarged vertical section through the needle and a portion of needle carrier.

Figure 7:
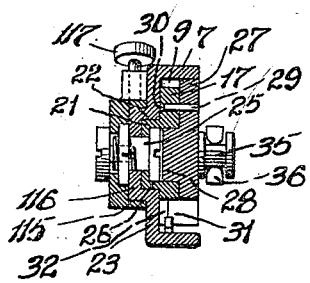
Fig. 7 is a vertical section taken on the line VII—VII of Fig. 1.
Figure 8:
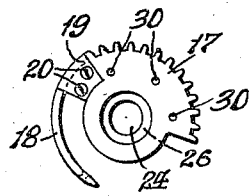
Fig. 8 is a side elevation of the needle carrier.
Figure 9:
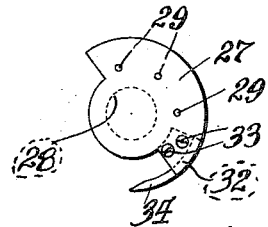
Fig. 9 is a side elevation of the awl carrier.
Figure 10:
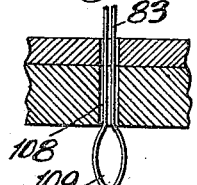
Fig. 10 is a vertical section taken on the line X—X of Fig. 1.

Referring to the drawings, 1 designates a base having a supporting frame 2 mounted thereon, said frame having a pair of oppositely disposed walls 3. Located in each wall 3 is a bearing 4, said bearings being oppositely disposed and supporting a horizontally arranged power shaft 5. Secured to the front wall 6 of the frame 2 is a forwardly extending supporting member 7 which comprises a part of the sititching head, and formed in said member 7 are a pair of circular seating recesses 8 and 9 respectively. Mounted in the recess 8 is a segmental gear 10 which is secured to a stub shaft 11, said stub shaft being supported in a bearing 12 which is extended from the member 7. Secured to the extended end of the stub shaft 11 is a crank 13, said crank being connected to one end of an eccentric rod 14 which leads from the eccentric strap 15 of the eccentric 16 which is secured to the shaft 5.

Located in the recess 9 of the supporting member 7 is a segmental gear 17 which is in mesh with the segmental gear 10, said gear 17 comprising the carrier for the needle 18, said needle being secured to the carrier by the clamping plate 19 and screws 20. The carrier 17 has a hub 21 formed thereon which is adapted to nest in a bearing 22 which is formed on the wall 23 of the recess 9, and concentrically arranged in said hub is an opening 24 which is for the reception of and to hold a screw 25, the head of said screw being seated in the enlarged bore 26 which is formed in the hub 21.

Located adjacent one side of the needle carrier 17 is an awl carrier 27 which is arranged concentric with said needle carrier and having a hub 28 formed on one side thereof which is seated in the enlarged bore 26 of the needle carrier. Extending from one side of the awl carrier 27 are a plurality of guiding pins 29, said pins being seated in respective openings 30 which are formed in the needle carrier 17.

Formed on the awl carrier 27 is an underlapping portion 31 which is adapted to underlap the lower portion of the needle carrier 17, and removably secured to said underlapping portion 31 by the clamping plate 32 and screws 33 is an awl 34.

Extending from the awl carrier 27 on the side opposite the hub 28 is a grooved collar 35, and engaging the groove of said collar is a bifurcated end 36 of a lever 37, said lever being adjustably pivoted at 38 to a pair of supporting ledges 39, the opposite end of said lever being bent upwardly as shown at 40 and carrying a friction roller 41. Formed in each of the ledges 39 is a slot 42, said slots providing means for adjusting the pivot 38 of the lever 37.

Secured to the power shaft 5 beneath the up-turned end 40 of the lever 37 is a cam wheel 43 having a shifting raceway 44 formed in its periphery in which is mounted the friction roller 41 of said lever.

Secured to the power shaft 5 between the walls 3 of the frame 2 is a cam wheel 45 having a shifting race-way 46 and depending in said race-way is a friction roller 47 which is secured to one end of a lever 48, said lever being pivoted at 49 to the horizontal portion 50 of the frame 2, the opposite end of said lever extending through a slot 51 which is formed in the front wall 6 of said frame 2. Secured to the extending end of the lever 48 is a swivel block 52 which horizontally supports a loop forming bar 53, the extending end of said bar being slidably mounted in an opening 54 which is formed in the wall 23 of the supporting member 7, there being a recess 55 formed in said wall 23 forming part of the opening 54, said bar 53 having a thread engaging notch 56 formed in its forward end.

Depending from the wall 23 beneath the needle carrier 17 is a supporting extension 57 having a pair of spaced apart vertically arranged guides 58, one of which (58) is adjustable by means of adjusting screws 58ˣ, and mounted between said guides is a combined cutting and feeding block 59. Formed on the block 59 is a circular portion 60 having a thread-feeding groove 61 in its under face, the upper end of said portion 60 terminating at 62 beneath the shoe rest 63 which is secured to the front edge of the wall 23. Depending from the shoe rest 63 is a thread-guiding portion 64 having a thread-guiding recess 65 formed therein adjacent its lower end, said recess being in alinement with the upper end of the groove 61.

Carried by the block 59 is a thread-cutting knife 66 which bears against one side of the thread-guiding portion 64. Secured to the block 59 is a pin 67 and mounted on said pin is one end of a lever 68 which is pivoted at 69 to the frame 2, the opposite end of said lever bearing a friction roller 70 which is engaged in a race way 71, said race way being formed in one side of a cam disk 72 which is secured to the power shaft 5 between the cam wheel 43 and one of the walls 3 of the frame 2.

Formed on the opposite side of said disk 72 is a race way 73 and mounted in said race way is a friction roller 74 which is secured to one end of a lever 75, said lever being mounted on the pivot 69. The opposite end of said lever engages one end of a feed lever 76 which is pivoted at 77 to the block 59, the opposite end of said lever 76 carrying a thread-feeding shoe 78, the feeding end of said shoe bearing against the under side of the circular portion 60.

Formed in the shoe rest 63 is an elongated opening 79 having a V-shaped end 80, said opening being for the reception of the needle 18. Formed in the outer periphery of the needle 18 is a thread-feeding groove 81 which leads to the needle eye 82, said groove and eye being for the reception of the continuous needle-looping thread 83 which leads from the take-up lever 84, said take-up lever being pivotally mounted at 85 to the brackets 86 which are mounted on top of the walls 3.

Secured to one end of said take-up lever 84 is a friction roller 87 which is mounted in a race way 88 formed in one side of a cam disk 89. Formed on the opposite side of said cam disk 89 which is secured to the shaft 5 is a race way 90, and mounted in said race way 90 is a friction roller 91 which is secured to one end of a thread-holding lever 92 pivoted at 93 to the brackets 94. The thread-holding lever operates on the needle-looping thread 83 which is fed from the spool 95 mounted on the bracket 96, said bracket being located at the rear of the frame 2.

Mounted between the rear legs 97 of the frame 2 is a spool of thread 98 from which is fed a continuous locking loop thread 99, said thread 99 being fed into a wax pot 100, where it is entrained through the wax in said pot by a guiding lever 101, said thread 99 upon leaving the wax pot passing through a wiper 102 and then is guided by the roller 103 and is engaged by the friction lever 104, which holds said thread against the under side of the loop-forming bar 53 and in the recess 55 of the opening 54 which is formed in the wall 23.

Mounted on the lower portion of the frame 2 adjacent the legs 97 is a spool of thread 105 from which leads a lock thread 106, said thread leading to the thread-feeding groove 61 of the circular portion 60 which forms part of the reciprocating block 59, said thread being engaged between said groove and the thread-feeding shoe 78, the forward end of said thread being engaged in the recess 65 of the thread guiding portion 64.

Figure 13:
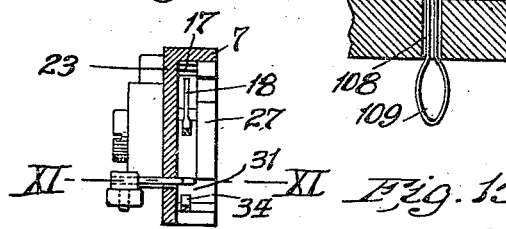
Fig. 13 is an enlarged fragmentary view showing the first operation of the needle through the awl puncture made in a portion of a sole, and in which a needle thread loop has been made.
Figure 14:
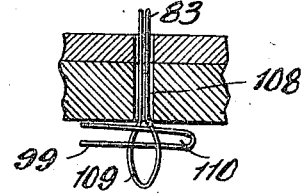
Fig. 14 is an enlarged fragmentary view similar to Fig. 13 showing the next operation relating to the loop forming bar in which a locking loop has been inserted through the needle thread loop.

In the operation of this improved stitching machine when power is applied to the power wheel 107 which is secured to the shaft 5 reciprocatory motion is applied to the eccentric rod 14, thereby rocking the crank 13 and stub shaft 11 and imparting a rocking movement to the segmental gear 10, the needle carrier 17 and the awl carrier 27 which is slidingly secured to the needle carrier. The awl 34 on its upward movement passes through the opening 79 of the shoe rest 63 and makes a puncture in the sole of the shoe to be sewn which is mounted on the shoe rest. While the awl is engaged in the sole an inward movement is applied to the bifurcated end 36 of the lever 37 by the cam wheel 43, thereby causing the awl carrier and awl carried thereby to be moved toward an alining position with the needle 18. The awl 34 is retracted from the puncture in the sole after the awl puncture of the sole has been left in an alining position ready for the reception of the needle 18 as the awl moves away from the awl puncture. The needle 18 on its descent and passage through the awl puncture in the sole, designated as 108 in Fig. 13, will carry a portion of the continuous needle-looping thread through the puncture, said needle passing through the opening 79 of the shoe rest 63, and as the needle is backed off on its return movement a loop 109 is formed in the needle-looping thread 83 on the inner curve of the needle and on the under side of the shoe rest and in horizontally alining position with the loop-forming bar opening 54. As the needle 18 is being backed off or retracted upwardly the extending end of the lever 48 bearing the swivel block 52 and loop-forming bar 53 is being moved inwardly by actuation of the cam wheel 45, and since the extending end of the continuous locking-loop thread 99 is first extended upwardly through the V-shaped end 80 of the opening 79 of the shoe rest 63, the notch 56 of the loop-forming bar 53 in its horizontal inward movement will engage the vertical extending portion of the thread 99 and loop the same, said bar 53 on its inward movement forcing the loop 110 (as shown clearly in Fig. 14) through the needle thread loop 109.

Figure 15:
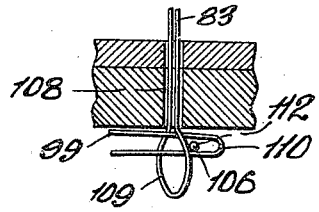
Fig. 15 is an enlarged view similar to Fig. 14, but showing the single strand locking thread inserted through the locking loop.

Immediately after the formation of the loop 110 and as the bar 53 is moving rearwardly by actuation of the lever 48, and cam wheel 45, the forward end of the lever 75 is forced downwardly thereby actuating the feed lever 76 and causing the thread-feeding shoe 78 to be moved upwardly against the inner face of the circular portion 60, thereby pressing against the lock thread 106 which is engaged in the thread feeding groove 61 of the circular portion 60 and feeding the extending end of said locking thread 106 upwardly and outwardly from the recess 65 of the thread guiding portion 64 and inserting the extending end of said thread 106 in the locking-loop thread 110 and outside of the needle loop thread 109 (see Fig. 15).

Immediately after the extending end of the lock thread 106 has been fed into the locking loop thread 110, an upward movement is applied to the forward end of the lever 68 by the cam disk 72, said upward movement of the lever 68 carrying the block 59 upwardly and the knife 66 carried thereby will engage the extending portion of the lock thread 106 and sever it against the cutting edge 111, thereby forming a lock bar 112 as shown in Fig. 15, relative to the locking loop 110.

Figure 16:
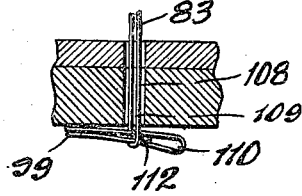
Fig. 16 shows the needle thread loop in a position of being drawn upwardly.
Figure 11:
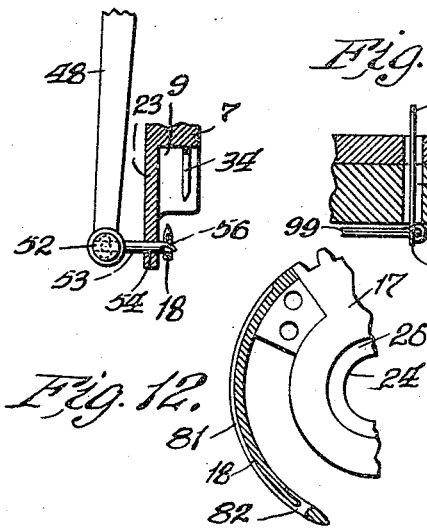
Fig. 11 is a horizontal section taken on the line XI—XI of Fig. 10.
Figure 17:
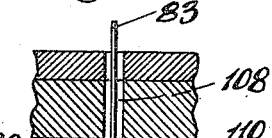
Fig. 17 shows the locking loop in a rearwardly drawn position against the single strand locking thread.
Figure 19:
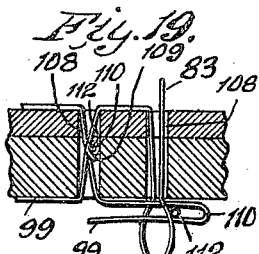
Fig. 19 shows the intersecting loops and the single strand locking thread drawn into the awl puncture, which is the last operation.
Figure 18:
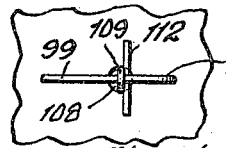
Fig. 18 is an inverted view of Fig. 16.

Since the needle 18 was the first to operate relative to forming the needle loop 109 said loop 109 is the first in order to be retracted into the awl puncture 108 in which the lower end of the loop will be drawn against the locking loop 110 (see Fig. 16). At this point the locking loop 110 is drawn rearwardly, thereby firmly holding the lock bar 112 formed by the cut-out portion of the lock thread 106 against the lower end of the needle loop 109, as shown in Fig. 17. At this point the loops 109 and 110 and the lock bar 112 are drawn upwardly into the awl puncture 108 approximately midway thereof, as shown in Fig. 19, said loops and lock bar being drawn taut relative to each other and securely nested in the awl puncture in which the interlacing junctures thereof are protected against exposure and consequently wear.

It is obvious that after each awl puncture made by the awl 34 in the sole of a shoe or other article to be stitched a repetition of loop forming and lock bar interlacing and threading relative to sewing follow in the succeeding operations.

Attention is called to the awl carrier 27 which is slidingly secured to the needle carrier 17 in which the pins 29 secured to the awl carrier slidingly engage respective openings 30 formed in the needle carrier, the engagement of said pins with said openings providing for reciprocatory movement being applied to the awl carrier from the needle carrier and in addition thereto the sliding engagement of said pins with the needle carrier along with the hub 28 of the awl carrier provides for a true and positive sliding relation of the awl carrier, as the awl 34 is moved to and from an alining traveling position relative to the needle 18 of the needle carrier which provides for the carrying over of the awl puncture made in the material to an alining position relative to the needle.

In order to hold the shoe in proper position on the shoe rest 63 a pressing member 113 having a foot 114 is provided, there being a bearing 115 formed in said pressing member which is adapted to be rotatably mounted on the hub 116 which is formed on the outside of the bearing 22 in which the hub 21 of the needle carrier 17 is mounted. Carried by the pressing member 113 is a binding screw 117, the inner end of which is adapted to bear on the periphery of the hub 116. The foot 114 of the pressing member has a portion thereof which is adapted to overlap a portion of the shoe rest 63 and formed in said foot in an alining position with the opening 79 of said shoe rest is an opening 118 through which the needle 18 is adapted to reciprocate (see Fig. 4).

In the operation of the pressing member 113 when not in use the foot 114 is in a thrown back position, whereas when a shoe to be sewn relative to the sole is mounted on the shoe rest and placed in proper position relative to the alinement of the openings 79 and 118 of the shoe rest 63 and pressing foot respectively, then the pressing member 113 is pulled over until the foot thereof engages against the upper portion of the sole. Then the binding screw 117 is set, thereby holding the pressing member and foot in a set position relative to the shoe rest 63, in which position said foot and shoe rest provide a guiding member for the shoe as the awl 34 of the awl carrier feeds over toward an alining position with the needle.

What I claim and desire to secure by Letters Patent of the United States, is: —

1. In a stitching machine, an oscillating arc shaped needle, a reciprocating thread-carrying bar, said needle and said bar each adapted to form a thread loop, a pushing element adapted to feed a locking thread into one of said loops, and means for severing said locking thread.

2. In a stitching machine, an oscillating arc shaped needle, a reciprocating thread-carrying bar moving in a plane perpendicular to the plane of said needle, said needle and said bar each adapted to form a thread loop, a pushing element adapted to feed a locking thread into one of said loops, and means for severing said locking thread after a portion thereof has been inserted in one of said loops.

3. In a stitching machine, an oscillating needle carrier having an arc shaped needle, an awl carrier mounted to oscillate on the same axis as said needle carrier and carrying an opposed arc shaped awl normally out of line with said needle, said needle carrier and said awl carrier having the one a recess and the other a pin slidably engaging said recess to cause said carriers to rotate in unison, means for oscillating said needle carrier to cause said awl and said needle carrier to successively enter the work, and means for moving said awl carrier to bring the awl in line with the needle after the awl has penetrated the work.

4. In a stitching machine, a head member having a bearing recess, a gear segment having a hollow hub journaled in said recess and carrying an arc shaped needle, a segmental awl carrier having a hub slidably mounted in said hollow hub, means for locking said carrier against independent rotation, means engaging said gear segment for oscillating the same, and means for sliding said awl carrier.

5. In a stitching machine, a reciprocating loop forming needle, a reciprocating thread carrying bar adapted to spread the loop formed by the needle and lay a loop therein, and a pushing element adapted to feed a locking thread into said second loop, and means for severing said locking thread.

6. In a stitching machine, the combination with loop forming means, of means for inserting a locking thread therein comprising a curved thread guide, a rocking lever, and a yielding thread feeding shoe carried by said lever.

7. In a stitching machine, the combination with the work support and loop forming means, of means for pushing a locking thread through the loop, comprising a curved thread guide, a rocking lever, a second lever pivoted to said first named lever and having a curved face coöperating with said guide, and a spring acting on said lever.

8. In a stitching machine, the combination with the work support and loop forming means, of a means for inserting and severing a locking thread comprising a curved thread guide, a reciprocating slide carrying a cutter, a lever pivoted to said slide and carrying a pushing shoe coöperating with said guide, means for rocking said lever, and means for reciprocating said slide.

CHARLES E. MYERS.